UNITED STATES PATENT OFFICE 2,476,166

ALPHA, ALPHA' DITHIOCARBONO-DIALIPHATIC ACIDS

Stephen J. Wayo, Whiting, Ind., assignor to Sinclair Refining Company, New York, N. Y., a corporation of Maine No Drawing. Application June 8, 1945, Serial No. 598,417

8 Claims. (Cl. 260—399)

This invention relates to novel alpha-substituted dialiphatic acids. It provides new compositions of matter and also provides a method by which the new compositions of matter may with advantage be prepared.

The products of my present invention may, according to conventional nomenclature, be designated alpha, alpha'-dithiocarbono-dialiphatic acids, and may be represented by the structural formula:

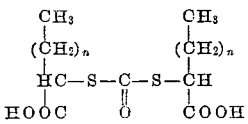

where $n$ represents one of the integers 13 and 15.

These novel compositions of matter have been found to be of particular utility as rust inhibiting addends in the compounding of mineral oil compositions, for instance compositions intended for use as turbine oils or the like.

My present invention is predicated upon the discovery that if the sodium salt of an alpha-halo-aliphatic acid of the class described be caused to react in alcoholic solution with ammonium dithiocarbamate, the latter will displace the alpha-halogen atoms from two molecules of the alpha-halo-aliphatic acid salt to form what appears to be the sodium salt of the corresponding alpha, alpha'-dithiocarbimino-dialiphatic acid, which by hydrolysis, effected by heating with water, is converted to the sodium salt of alpha, alpha'-dithiocarbono-dialiphatic acid, which in turn may be converted to the free thiodi-acid by reaction with a strong mineral acid, for instance sulfuric acid or hydrochloric acid.

The reaction by which the intermediate, alpha, alpha' - dithiocarbimino - dialiphatic acid, is formed is believed to be represented by the following equations, where the sodium salt of alpha, alpha'-bromostearic acid is used:

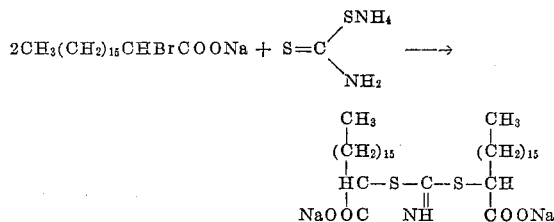

Accordingly, the composition of my present invention may be prepared by reacting a sodium salt of an alpha-halo-stearic acid, -palmitic acid, or mixtures thereof, in alcoholic solution with ammonium dithiocarbamate, hydrolyzing the reaction product by diluting the alcoholic solution thereof with water, and heating, precipitating and filtering the thiodi-acid salt from the dilute alcohol solution, suspending the precipitated salt in water, acidifying the aqueous suspension with an excess of a strong mineral acid, and separating the resultant alpha, alpha'-dithiocarbono-dialiphatic acid from the solution.

The ammonium dithiocarbamate used in the production of my new compounds may be prepared by reacting carbon disulfide with ammonia in cold alcoholic solution.

The sodium salt of the alpha-halo-aliphatic acid used is with advantage prepared from an alpha-brominated aliphatic acid, i. e. stearic or palmitic, though other halo-aliphatic acids may be used, for instance alpha-chlorostearic acid or alpha-chloropalmitic acid, or mixtures thereof.

The alpha-bromoaliphatic acid may be prepared by reacting bromine with stearic acid or palmitic acid or mixtures thereof in the presence of red phosphorus. This reaction results in the formation of alpha-bromostearic acid bromide, for instance where stearic acid is used, which is readily hydrolyzed to form alpha-bromostearic acid. Where palmitic acid is similarly treated, alpha-bromopalmitic acid will result, and similarly, a mixture of stearic acid and palmitic acid, when so treated, will result in a mixture of alpha-bromostearic acid and alpha-bromopalmitic acid.

The process of my present invention will be illustrated by the following specific example of its application to the preparation of alpha, alpha'-dithiocarbono-dialiphatic acid of the present invention using alpha-bromostearic acid prepared from commercial double-pressed stearic acid.

In carrying out this operation the ammonium dithiocarbamate was first prepared by adding 16 cc. of concentrated (28%) aqueous ammonium hydroxide solution to a solution of 4.18 grams of carbon disulfide in 265 cc. of 95% ethyl alcohol. 36 grams of alpha-bromostearic acid was then added to 100 cc. of 50% ethyl alcohol in a 1-liter Erlenmeyer flask. This alpha-bromostearic acid was converted to the sodium salt by adding, with slight cooling, 5.4 grams of sodium carbonate in 25 cc. of water. The ammonium dithiocarbamate solution, prepared as just described, was then added to the mixture in the flask and the composite mixture was then heated with refluxing on a steam bath for two hours. At this point the alcohol concentration of the mixture was 75%. The mixture was then diluted with 200 cc. of water so as to reduce the alcohol concentration to about 50% and the heating and refluxing was continued for two additional hours.

The reaction mixture was then cooled to room temperature to complete the precipitation of the thiodi-acid salt and then filtered. The resultant precipitate was then suspended in 300 cc. of water, acidified with an excess of dilute (1:3) hydrochloric acid, and extracted with ether. The extract was washed with water, filtered through paper, and the solvent allowed to evaporate therefrom at room temperature.

By the foregoing procedure 12 grams of a crude product containing 50% of alpha, alpha'-dithiocarbono-dialiphatic acid was obtained, which was equivalent to about 40% of the theoretical yield. The crude product was a brown, somewhat brittle, waxy solid.

The alpha-bromostearic acid used in the foregoing operation was prepared from a relatively pure stearic acid comprising 90% stearic acid, 6% palmitic acid, and 4% oleic acid. It is supposed that during the bromination the oleic acid constituent is converted to 2, 9, 10-tri bromostearic acid and some dibromostearic acid and dibromopalmitic acid is formed. These impurities may be separated from the mono-alpha-bromoacids by recrystallization of the crude bromoacid mixture from benzene solution. The alpha-bromostearic acid used in the foregoing specific example was, by such recrystallization, purified to 95% or better alpha-bromostearic acid.

The product prepared as just described was found by analysis to have a neutralization number of 150 and to contain 5.4% sulfur and 0.95% bromine.

Where the alpha-halo-dipalmitic acid is a mixture of stearic and palmitic acid, as in the foregoing example, the product will consist of a mixture of alpha, alpha'-dithiocarbono-distearic acid, alpha, alpha'-dithiocarbono-dipalmitic acid and thiodi-acid formed from one molecule of stearic acid and one molecule of palmitic acid.

For converting the intermediate thiodi-acid salt to the free di-acid, it is desirable to use an excess of the mineral acid. Sulfuric acid may be used for this purpose, but hydrochloric acid has been found to be particularly advantageous. Also, in reacting the alpha-haloaliphatic acid salt with ammonium dithiocarbamate to form the alpha, alpha'-dithiocarbimino-dialiphatic acid intermediate product, it is desirable that the reaction be carried as nearly as possible to completion so as to displace the bromine to the fullest extent practical. This is particularly desirable where the presence of a substantial amount of bromine as an impurity in the product is objectionable. Further, instead of ethyl alcohol, other low molecular weight alcohol, such as methyl, propyl or butyl, may be used as the solvent for the reaction mixture.

I claim:
1. As a composition of matter, alpha, alpha'-dithiocarbono-dialiphatic acid represented by the structural formula

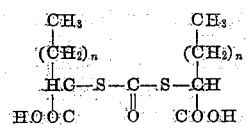

where $n$ represents one of the integers 13 and 15.

2. As a composition of matter, alpha, alpha'-dithiocarbono-distearic acid.

3. As a composition of matter, alpha, alpha'-dithiocarbono-dipalmitic acid.

4. A process for the production of alpha, alpha'-dithiocarbono-dialiphatic acid, comprising reacting the sodium salt of an alpha-haloaliphatic acid of the class consisting of alpha-halo stearic acid, alpha-halo palmitic acid, and mixtures thereof, in alcoholic solution with ammonium dithiocarbamate, hydrolyzing the reaction product, separating the resultant thiodi-acid salt from the alcoholic solution, suspending the separated salt in water, and acidifying the aqueous suspension by treatment with a mineral acid.

5. A process for the production of alpha, alpha'-dithiocarbono-dialiphatic acid, comprising reacting the sodium salt of an alpha-haloaliphatic acid of the class consisting of alpha-halo stearic acid, alpha-halo palmitic acid, and mixtures thereof, in alcoholic solution with ammonium dithiocarbamate, hydrolyzing the reaction product, separating the resultant thiodi-acid salt from the alcoholic solution, suspending the separated salt in water, and acidifying the aqueous suspension by treatment with hydrochloric acid.

6. A process for the production of alpha, alpha'-dithiocarbono-dialiphatic acid, comprising reacting the sodium salt of an alpha-haloaliphatic acid of the class consisting of alpha-halo stearic acid, alpha-halo palmitic acid, and mixtures thereof, in a solution of ethyl alcohol with ammonium dithiocarbamate, hydrolyzing the reaction product, separating the resultant thiodi-acid salt from the alcoholic solution, suspending the separated salt in water, and acidifying the aqueous suspension by treatment with hydrochloric acid.

7. A process for the production of alpha, alpha'-dithiocarbono-distearic acid, comprising reacting the sodium salt of alpha-bromostearic acid in solution in ethyl alcohol with ammonium dithiocarbamate, hydrolyzing the reaction product, separating the resultant thiodi-acid salt from the alcoholic solution, suspending the separated salt in water, and acidifying the aqueous suspension by treatment with hydrochloric acid.

8. A process for the production of alpha, alpha'-dithiocarbono-dipalmitic acid, comprising reacting the sodium salt of alpha-bromopalmitic acid in solution in ethyl alcohol with ammonium dithiocarbamate, hydrolyzing the reaction product, separating the resultant thiodi-acid salt from the alcoholic solution, suspending the separated salt in water, and acidifying the aqueous suspension by treatment with hydrochloric acid.

STEPHEN J. WAYO.

REFERENCES CITED

The following references are of record in the file of this patent:

UNITED STATES PATENTS

| Number | Name | Date |
| --- | --- | --- |
| 2,020,021 | Farrington et al. | Nov. 5, 1935 |
| 2,320,287 | Lieber et al. | May 25, 1943 |
| 2,368,605 | White | Jan. 30, 1945 |
| 2,368,670 | Lincoln et al. | Feb. 6, 1945 |

OTHER REFERENCES

Beilstein-Band III—V, 1942 edition, page 191, Sys. 221, citing Holmberg (1922).

Beilstein-Band III, Vierte Auflage, 1921 edition, p. 252, Syst. 220, p. 300, Syst. 222, citing Bielman and Holmberg.